(12) United States Patent
Holzapfel et al.

(10) Patent No.: US 9,187,336 B2
(45) Date of Patent: Nov. 17, 2015

(54) PROCESS FOR THE PREPARATION OF LITHIUM TITANIUM SPINEL AND ITS USE

(71) Applicant: SUED-CHEMIE IP GMBH & CO. KG, Munich (DE)

(72) Inventors: Michael Holzapfel, Freising (DE); Andreas Laumann, München (DE); Gerhard Nuspl, München (DE); Karl Fehr, München (DE); Florian Kiefer, München (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 0 days.

(21) Appl. No.: 14/242,435

(22) Filed: Apr. 1, 2014

(65) Prior Publication Data

US 2014/0209834 A1    Jul. 31, 2014

Related U.S. Application Data

(62) Division of application No. 12/996,174, filed as application No. PCT/EP2009/003972 on Jun. 3, 2009.

(30) Foreign Application Priority Data

Jun. 3, 2008   (DE) .......................... 10 2008 026 580

(51) Int. Cl.
*H01M 4/13* (2010.01)
*C01D 15/02* (2006.01)
(Continued)

(52) U.S. Cl.
CPC .............. *C01D 15/02* (2013.01); *C01G 23/005* (2013.01); *H01M 4/485* (2013.01); *C01P 2002/32* (2013.01); *C01P 2002/52* (2013.01); *C01P 2002/72* (2013.01); *C01P 2002/76* (2013.01); *C01P 2004/03* (2013.01);
(Continued)

(58) Field of Classification Search
USPC ....................................................... 429/231.1
See application file for complete search history.

(56) References Cited

U.S. PATENT DOCUMENTS 5,545,468 A    8/1996   Koshiba et al.
6,645,673 B2   11/2003  Yamawaki et al.
(Continued)

FOREIGN PATENT DOCUMENTS

DE    103 19 464 A1    11/2004
EP    1 722 439 A1     11/2006
(Continued)

OTHER PUBLICATIONS

Simon, D.R., University of Cincinnati Doctoral Thesis titled "Characterization of Li4Ti5O12 and LiMn2O4 spinel materials treated with aqueous acidic solutions", printed by Wohrmann Print Service, Apr. 24, 2007.*
(Continued)

*Primary Examiner* — Patrick Ryan
*Assistant Examiner* — Lucas J O'Donnell
(74) *Attorney, Agent, or Firm* — RatnerPrestia

(57) ABSTRACT

Non-doped and doped lithium titanate $Li_4Ti_5O_{12}$ obtainable by the thermal reaction of a stoichiometric composite oxide containing $Li_2TiO_3$ and $TiO_2$, the preparation of the stoichiometric composite oxide, as well as a process for the preparation of lithium titanate $Li_4Ti_5O_{12}$ and its use as anode material in rechargeable lithium-ion batteries.

9 Claims, 7 Drawing Sheets

(51) Int. Cl.
*C01G 23/00* (2006.01)
*H01M 4/485* (2010.01)
*H01M 10/0525* (2010.01)
*H01M 10/42* (2006.01)

(52) U.S. Cl.
CPC ........ *C01P 2004/51* (2013.01); *C01P 2004/62* (2013.01); *C01P 2006/12* (2013.01); *H01M 10/0525* (2013.01); *H01M 2010/4292* (2013.01); *Y02E 60/122* (2013.01); *Y10T 428/2982* (2015.01)

(56) References Cited

U.S. PATENT DOCUMENTS

| | | | |
|---|---|---|---|
| 6,686,094 | B2 | 2/2004 | Omaru et al. |
| 7,682,596 | B2 | 3/2010 | Bourbon et al. |
| 2001/0031401 | A1 | 10/2001 | Yamawaki et al. |
| 2002/0136954 | A1 | 9/2002 | Thackeray et al. |
| 2004/0202934 | A1 | 10/2004 | Zaghib et al. |
| 2004/0217335 | A1 | 11/2004 | Sterzel |
| 2006/0257746 | A1 | 11/2006 | Inagaki et al. |
| 2007/0202036 | A1 | 8/2007 | Jongen et al. |
| 2007/0243467 | A1 | 10/2007 | Zaghib et al. |
| 2007/0281211 | A1 | 12/2007 | Zhang et al. |
| 2008/0031798 | A1 | 2/2008 | Bourbon et al. |

FOREIGN PATENT DOCUMENTS

| | | |
|---|---|---|
| FR | 2 874 603 | 3/2006 |
| JP | 10-251020 | 9/1998 |
| JP | 2003-137547 | 5/2003 |
| JP | 2008-511528 | 4/2008 |

OTHER PUBLICATIONS

Cruz, D. et al., "Synthesis of $Li_2MO_3$ (M=Ti or Zr) by the combustion method," Solid State Sciences 8 (2006) 470-475.

Dokko, K. et al., "Preparation of micro-dot electrodes of $LiCoO_2$ and $Li_4Ti_5O_{12}$ for lithium micro-batteries," Electrochimica Acta 51 (2005) 966-971.

Fattakhova, D. et al., "Solvothermal Synthesis of Electrochemically Active Nanocrystalline Li—Ti—O Spinel," Mat. Res. Soc. Symp. Proc. vol. 703 (2002) 165-169.

Ferg, E. et al., "Spinel Anodes for Lithium-Ion Batteries," J. Electrochem. Soc. vol. 141, No. 11 (1994) L147-L150.

Hao, Y-J. et al., "Influence of various complex agents on electrochemical property of $Li_4Ti_5O_{12}$ anode material," Journal of Alloys and Compounds (2006), doi:10.1016/j.jallcom.2006.08.082.

Huang, S. et al., "Preparation and electrochemical performance of Ag doped $Li_4Ti_5O_{12}$," Electrochemistry Communications 6 (2004) 1093-1097.

Huang, S. et al., "Effects of dopant on the electrochemical performance of $Li_4Ti_5O_{12}$ as electrode material for lithium ion batteries," Journal of Power Sources 165 (2007) 408-412.

Jiang, C. et al., "Effect of particle dispersion on high rate performance of nano-sized $Li_4Ti_5O_{12}$ anode," Electrochimica Acta 52 (2007) 6470-6475.

Kalbac, M. et al., "Phase-pure nanocrystalline $Li_4Ti_5O_{12}$ for a lithium-ion battery," J. Solid State Electrochem 8 (2003) 2-6.

Matsui, E. et al., "Solid-State Synthesis of 70 nm $Li_4Ti_5O_{12}$ Particles by Mechanically Activating Intermediates with Amino Acids," J. Am. Ceram. Soc. 91 (2008) 1522-1527.

Nakahara, K. et al., "Preparation of particulate $Li_4Ti_5O_{12}$ having excellent characteristics as an electrode active material for power storage cells," Journal of Power Sources 117 (2003) 131-136.

Prosini, P. et al., "$Li_4Ti_5O_{12}$ as anode in all-solid-state, plastic, lithium-ion batteries for low-power applications," Solid State Ionics 144 (2001) 185-192.

Tomiha, M. et al., "Hydrothermal synthesis of alkali titanates from nano size titania powder," Journal of Materials Science 37 (2002) 2341-2344.

International Search Report of PCT/EP2009/003972 dated Sep. 16, 2009.

Zhang, Dong Ri et al., "Synthesis and Characterization of Nanocrystalline LiTiO2 Using a One-Step Hydrothermal Method," Journal of Industrial and Engineering Chemistry, 2007, pp. 92-96, vol. 13, No. 1.

Bruce et al., "Nanomaterials for Rechargeable Lithium Batteris," Angew. Chem. Int. Ed. 2008, 47, 2930-2946.

Ernst, F.O. et al., "Electrochemically active flame-made nanosized spinels: $LiMn_2O_4$, $Li_4Ti_5O_{12}$ and $LiFe_5O_8$," Materials Chemistry and Physics 2007, 101(2-3) pp. 372-378.

Kalbac, "Phase-pure nanocrystalline Li4Ti5O12 for a lithium-ion battery," J Solid State Electrochem 2003 vol. 8, pp. 2-6.

Fattakhova, "Solvothermal synthesis and electrochemical behavior of nanocrystalline cubic Li—Ti—O oxides with cationic disorder," Solid State Ionics Vo. 176, Jul. 2005, pp. 1877-1885.

Kostlanova, J. Matter. Res. vol. 23, No. 4, 1138-1146, submitted Oct. 29, 2007, published Apr. 2008.

\* cited by examiner 3 a 3b 3c

PROCESS FOR THE PREPARATION OF LITHIUM TITANIUM SPINEL AND ITS USE

CROSS REFERENCE TO RELATED APPLICATIONS

This application is a continuation of U.S. application Ser. No. 12/996,174, filed on Mar. 10, 2011, which is a National Phase application of PCT application number PCT/EP2009/003972, filed Jun. 3, 2009, which claims priority benefit of German application number DE 10 2008 026 580.2, filed Jun. 3, 2008, the content of each of which is incorporated herein by reference.

FIELD OF THE INVENTION

The present invention relates to doped and undoped lithium titanate $Li_4Ti_5O_{12}$ as well as a process for its preparation.

BACKGROUND OF THE INVENTION

The use of lithium titanate $Li_4Ti_5O_{12}$, or lithium titanium spinel for short, as a substitute for graphite as anode material in rechargeable lithium-ion batteries was proposed some time ago.

A current overview of anode materials in such batteries can be found e.g. in Bruce et al., Angew. Chem. Int. Ed. 2008, 47, 2930-2946.

The advantages of $Li_4Ti_5O_{12}$ compared with graphite are in particular its better cycle stability, its better thermal rating and the higher operational reliability. $Li_4Ti_5O_{12}$ has a relatively constant potential difference of 1.55 V compared with lithium and achieves several 1000 charge/discharge cycles with a loss of capacity of <20%.

Thus lithium titanate has a clearly more positive potential than graphite which has previously usually been used as anode in rechargeable lithium-ion batteries.

However, the higher potential also results in a lower voltage difference. Together with a reduced capacity of 175 mAh/g compared with 372 mAh/g (theoretical value) of graphite, this leads to a clearly lower energy density compared with lithium-ion batteries with graphite anodes.

However, $Li_4Ti_5O_{12}$ has a long life and is non-toxic and is therefore also not to be classified as posing a threat to the environment.

Recently, $LiFePO_4$ has been used as cathode material in lithium-ion batteries, with the result that a voltage difference of 2 V can be achieved in a combination of $Li_4Ti_5O_{12}$ and $LiFePO_4$.

Various aspects of the preparation of lithium titanate $Li_4Ti_5O_{12}$ are described in detail. Usually, $Li_4Ti_5O_{12}$ is obtained by means of a solid-state reaction between a titanium compound, typically $TiO_2$, and a lithium compound, typically $Li_2CO_3$, at high temperatures of over 750° C. (U.S. Pat. No. 5,545,468). This high-temperature calcining step appears to be necessary in order to obtain relatively pure, satisfactorily crystallizable $Li_4Ti_5O_{12}$, but this brings with it the disadvantage that primary particles are obtained which are too coarse and a partial fusion of the material occurs. The product obtained in this way must therefore be ground extensively, which leads to further impurities.

Typically, the high temperatures also often give rise to by-products, such as rutile or residues of anatase, which remain in the product (EP 1 722 439 A1).

Sol-gel processes for the preparation of $Li_4Ti_5O_{12}$ are also described (DE 103 19 464 A1). In these, organotitanium compounds, such as for example titanium tetraisopropoxide or titanium tetrabutoxide, are reacted in anhydrous media with for example lithium acetate or lithium ethoxide to produce $Li_4Ti_5O_{12}$. However, the sol-gel methods require the use of titanium starting compounds that are far more expensive than $TiO_2$ and the titanium content of which is lower than in $TiO_2$, with the result that preparing a lithium titanium spinel by means of the sol-gel method is usually uneconomical, in particular as the product still has to be calcined after the sol-gel reaction in order to achieve crystallinity.

In addition, preparation processes by means of flame spray pyrolysis are proposed (Ernst, F. O. et al. Materials Chemistry and Physics 2007, 101 (2-3) pp. 372-378) as well as so-called "hydrothermal processes" in anhydrous media (Kalbac, M. et al., Journal of Solid State Electrochemistry 2003, 8 (1) pp. 2-6).

Further possibilities for preparing lithium titanate, in particular by means of solid-state processes, are for example described in US 2007/0202036 A1 and U.S. Pat. No. 6,645,673, but they have the disadvantages already described above, that impurities such as for example rutile or residues of anatase are present, as well as further intermediate products of the solid-state reaction such as $Li_2TiO_3$ etc.

Furthermore, in addition to the preparation of non-doped $Li_4Ti_5O_{12}$, the preparation and properties of Al-, Ga- and Co-doped $Li_4Ti_5O_{12}$ have also been described (S. Huang et al. J. Power Sources 165 (2007), pp. 408-412).

DESCRIPTION OF THE INVENTION

There was therefore a need to provide an alternative preparation process for non-doped and doped lithium titanate which in particular makes the preparation of phase-pure non-doped or doped lithium titanate possible.

Surprisingly, it was found that doped and non-doped lithium titanate $Li_4Ti_5O_{12}$ can be obtained by the thermal reaction of a composite oxide containing $Li_2TiO_3$ and $TiO_2$. The $TiO_2/Li_2TiO_3$ ratio is in a range from 1.3 to 1.85, preferably from 1.41-1.7, still more preferably from 1.51-1.7.

The stoichiometric ratio of $TiO_2$ to $Li_2TiO_3$ in the composite oxide is in a range around the theoretical stoichiometric value of 1.5, which is due in particular to the volatility of the lithium starting compound under the chosen reaction conditions, in order to obtain a phase-pure product (cf. e.g. Dokko et. al. Elektrochimica Acta 51 (2005) 966-971, Jiang et. al. Electrochimica Acta 52 (2007), 6470-6475, Huang et. al. Electrochem. Comm. 6 (2004), 1093-97, Hao et. al., J. Alloys and Compounds (2006) doi: 10.1016/j.jallcomm.2006.08.082.

Preferably, a slight excess of the lithium compound is used, quite particularly from approx. 4-10% compared with the theoretical value. A slight deficit of the lithium compound is less preferred, but the precise value also often depends on the reactivity of the $TiO_2$ starting product which can vary from one manufacturer to another.

In the case of the preparation of non-doped lithium titanium spinel, the composite oxide consists only of these two constituents.

The term "composite oxide" means according to aspects of the invention that the constituents of the composite oxide form a completely homogeneous mixture which is achieved by a chemical and/or thermal treatment. The term "composite oxide" according to aspects of the invention is therefore not used for the purely mechanically prepared mixtures of the corresponding constituents, since completely homogeneous mixtures cannot usually be obtained mechanically.

The lithium titanate obtained according to aspects of the invention has an extremely low particle size, which leads to the current density in an anode that contains the lithium titanate material according to aspects of the invention being particularly high and wherein this anode further has a high cycle stability.

The term "lithium titanate" or "lithium titanate according to aspects of the invention" here refers to both the non-doped and the doped forms.

Quite particularly preferably, the lithium titanate according to aspects of the invention is phase-pure. The term "phase-pure" or "phase-pure lithium titanate" means according to aspects of the invention that no rutile phase can be detected in the end-product by means of XRD measurements within the limits of the usual measurement accuracy. In other words, the lithium titanate according to aspects of the invention is rutile-free in this preferred embodiment.

In preferred developments of the invention, the lithium titanate according to aspects of the invention is doped with at least one further metal, which leads to a further increase in stability and cycle stability when the doped lithium titanate is used as anode. In particular, this is achieved by the incorporation of additional metal ions, more preferably Al, Mg, Ga, Fe, Co, Sc, Y, Mn, Ni, Cr, V or several of these ions, into the lattice structure. Aluminium is quite particularly preferred. The doped lithium titanium spinels are also rutile-free in particularly preferred embodiments.

The doping metal ions which can sit on lattice sites of either the titanium or the lithium are preferably present in a quantity of 0.05 to 3% by weight, preferably 1-3% by weight, relative to the total spinel.

The preparation of the doped lithium titanium spinels is described in detail below.

Surprisingly, it was found that the non-doped and doped lithium titanate obtainable according to aspects of the invention has a particle size $d_{90} \leq 25$ μm in an unground sample, i.e. directly after reaction and separation (see below) and no fusion phenomena are to be observed in SEM micrographs of the product. Particularly preferably, it has a particle size $d_{50}$ of $\leq 1$ μm, quite particularly preferably in the range from 0.3-0.6 μm. As already stated, a small particle size leads to a higher current density and also to a better cycle stability, with the result that the lithium titanate can also be used particularly advantageously as a constituent of an anode in rechargeable lithium-ion batteries without further mechanical grinding steps. Of course, the product obtained can also be ground even more finely, should this be necessary for a specific use. The grinding procedure is carried out with methods known per se to a person skilled in the art.

Surprisingly, it was also found that the doped and non-doped lithium titanate obtained according to aspects of the invention has a relatively high BET surface area in the range from 2-15 $m^2/g$.

For the non-doped or doped lithium titanate obtainable according to aspects of the invention with the above-described properties, it has proved to be advantageous if the $Li_2TiO_3$ of the composite oxide is present in cubic phase at the start of the reaction. It is also preferred if the $TiO_2$ of the composite oxide is present, not in the rutile, but rather in the anatase, modification.

An object of the present invention is further achieved by providing a process for the preparation of a composite oxide containing x parts $Li_2TiO_3$ and y parts $TiO_2$ with $0.1 \leq x, y \leq 4$, wherein the $Li_2TiO_3$ is present in cubic phase and the $TiO_2$ in anatase modification. The composite oxide preferably serves as starting material for the lithium titanate according to aspects of the invention.

In this case, the constituents of the composite oxide are naturally present in the corresponding stoichiometric quantities, for example 2 parts $Li_2TiO_3$ and 3 parts $TiO_2$, for the subsequent reaction to produce the lithium titanate. As already stated, the ratio of $TiO_2$ to $Li_2TiO_3$ of the composite oxide for the subsequent reaction preferably lies in a range from 1.3 to 1.85, quite particularly preferably in the range from 1.4-1.7.

In principle, it is possible according to aspects of the invention to set the ratio of the components of the composite oxide to each other in such a way that typically all lithium titanium spinels of the type $Li_{1+x}Ti_{2-x}O_4$ with $0 \leq x \leq \frac{1}{3}$ of the space group Fd3m and generally also any mixed lithium titanium oxides of the generic formula $Li_xTi_yO$ ($0<x$, $y<1$) can be obtained in the subsequent thermal reaction (see below).

If doped spinels are to be prepared, a further—preferably—metal oxide compound of the doping metal(s) is additionally present in the composite oxide.

The process for the preparation of a composite oxide according to aspects of the invention comprises the steps of
a) providing an aqueous solution of LiOH
b) reacting the aqueous LiOH solution by adding solid $TiO_2$ at a temperature in the range from 100-250° C.

Optionally, there is the step of
c) separating the product obtained by the reaction from step b)

Instead of the optional separation, e.g. by means of filtration, etc., the reaction product or the suspension that contains the reaction product from step b) can e.g. also be subjected to a spray pyrolysis or other product-isolation methods known per se to a person skilled in the art.

Preferably, the $TiO_2$ is used in its anatase modification within the framework of the process according to aspects of the invention.

If, in the subsequent thermal reaction of the composite oxide, a doped lithium titanium spinel is to be prepared therefrom, a corresponding metal compound, in particular a metal compound of Al, Mg, Ga, Fe, Co, Sc as well as Y, Mn, Ni, Cr, V can be added either before the addition of the $TiO_2$ or at the same time as the addition of the $TiO_2$.

In the latter case, that is in the case of simultaneous addition, the corresponding metal oxide is preferably used. If the metal compound is already present before the addition of the $TiO_2$ in solution together with the LiOH, either a soluble metal compound, such as an acetate, nitrate and the like, which reacts to produce hydroxide or oxide at reaction temperature can be used or a suspension of the corresponding metal oxide. It is understood that several different metal oxides or metal compounds of the above-named metals can of course also be added, in order for example to then obtain mixed-doped lithium titanium spinels. In these cases, the composite oxide according to aspects of the invention therefore contains, in addition to the above-named two main constituents $Li_2TiO_3$ and $TiO_2$, other appropriate metal compounds, in particular oxides of the aforenamed doping metals.

It is further particularly advantageous that the aqueous LiOH solution is kept at a temperature of 100-250° C. during the reaction in step b), since this particularly encourages the reaction of the educts to produce the composite oxide according to aspects of the invention containing $Li_2TiO_3$ and $TiO_2$. If the temperature is too low, impurities occur in the end-product.

It is preferred that the reaction of the educts takes place over a period of 1-30 h, quite particularly preferably over a period of 15-25 h.

Surprisingly, it was found that the composite oxide obtainable by the process according to aspects of the invention and containing $Li_2TiO_3$ and $TiO_2$ which is separated in step c) for example by filtration is obtained in a uniform particle size in the range from 100-300 nm. The separated product is dried at a temperature of 70 to 120° C. and for example ground with an air-jet mill, which takes place particularly easily, since surprisingly only a very small agglomeration of the obtained product particles occurs.

An object of the present invention is further achieved by the provision of a process for the preparation of doped or non-doped lithium titanate, starting from the composite oxide according to aspects of the invention, wherein the composite oxide is sintered at a temperature of ≤850° C. Quite particularly preferably, the sintering takes place at even lower temperatures of ≤700° C.

It was surprisingly found that, unlike all previous solid-state synthesis processes for lithium titanate, a much lower temperature and also a much shorter reaction time can be chosen and yet the disadvantages of the state of the art, in particular the occurrence of further reaction products, can be avoided and lithium titanate is obtained.

When preparing doped lithium titanate, it is to be borne in mind that, in addition to the reaction according to aspects of the invention of a composite oxide already containing a doping-metal compound or a doping-metal oxide, the compound of the doping metal is also to be added after the synthesis of the (non-doped) lithium titanium spinel or also of the composite oxide in solid or liquid form (e.g. steeping) and then heated or calcined anew.

In contrast, a purely mechanical mixture consisting e.g. of $Li_2TiO_3$ and $TiO_2$ must be sintered at temperatures of more than 800-850° C., wherein different phases and products are obtained.

Typically, with the process according to aspects of the invention, the duration of the sintering is 0.5 to 20 hours and is thus clearly shorter than with conventional solid-state processes or compared with a purely mechanical stoichiometric mixture for example of the two starting compounds $Li_2TiO_3$ and $TiO_2$.

Within the framework of the present invention, the addition of strong bases during the total synthesis of lithium titanate can be advantageously dispensed with, since the LiOH which is used in the first synthesis step when preparing the composite oxide according to aspects of the invention acts as a base or "activator".

Thus, a total synthesis of doped or non-doped lithium titanate can be provided without using strong and also corrosive bases, such as NaOH or KOH, such as are indispensable in most of the above-named wet-chemical or hydrothermal processes of the state of the art. Moreover, this advantageously results in sodium or potassium impurities being avoided in the end-product.

As already stated above, it was surprisingly found that the necessary temperatures in the calcining step which leads to the phase-pure lithium titanate $Li_4Ti_5O_{12}$ according to aspects of the invention are extremely low compared with the state of the art. Compared with temperatures of more than 800-850° C. of the state of the art, according to aspects of the invention temperatures of only <750° C., preferably <700° C. are necessary. For example, a clean product was already obtained after 15 hours' reaction time at a temperature of only 700° C. (see below).

A further advantage of the process according to aspects of the invention compared with the usual solid-state synthesis routes for the preparation of lithium titanium spinels is further that a calcining with neither $LiOH.H_2O$ nor $Li_2CO_3$ need be carried out. Both compounds usually used are highly reactive and corrosive at the high temperatures used of more than 850° C. and thus strongly attack the walls of the reactors in which the calcining takes place. With the $Li_2TiO_3$ used according to aspects of the invention, no reaction with the materials of the reactors takes place.

Preferably, the doped or non-doped lithium titanate according to aspects of the invention is used as anode material in rechargeable lithium-ion batteries.

Thus, the present invention also relates to a rechargeable lithium-ion battery comprising an anode and cathode as well as an electrolyte, wherein the anode contains lithium titanate $Li_4Ti_5O_{12}$ according to aspects of the invention.

The anode according to aspects of the invention has a capacity retention of at least 90%, quite particularly preferably of at least 95% at a rate of 20 C and a specific charge/discharge capacity of >160 Ah/kg.

BRIEF DESCRIPTION OF THE DRAWINGS

The invention is described in more detail below with reference to drawings and embodiment examples which are not, however, to be considered limiting.

There are shown in.

EMBODIMENT EXAMPLES

1. General Description of the Process According to Aspects of the Invention for the Preparation of the Composite Oxide According to Aspects of the Invention The compounds used for the process according to aspects of the invention for the preparation of a composite oxide containing x $Li_2TiO_3$/y $TiO_2$ (x and y have the meanings defined above) are, as starting products, initially $LiOH.H_2O$ and $TiO_2$ in anatase form. Optionally, oxides of the corresponding doping metals are added. The water content varies in the case of commercially available $LiOH.H_2O$ (from Merck) from batch to batch and was determined prior to the synthesis.

$LiOH.H_2O$ is initially dissolved in distilled water and heated to a temperature of 50 to 60° C. Once the lithium hydroxide has completely dissolved, a corresponding quantity (depending on the desired end-product) of solid $TiO_2$ in anatase modification (available from Sachtleben) is added to the 50 to 60° C. hot solution under constant stirring. After homogeneous distribution of the anatase, the suspension is placed in an autoclave, wherein the reaction then took place under continuous stirring at a temperature of 100° C. to 250° C., typically at 150 to 200° C. for a period of approx. 18 hours.

Parr autoclaves (Parr 4843 pressure reactor) with double stirrer and a steel heating coil were used as autoclaves.

After the end of the reaction, the composite oxide x Li$_2$TiO$_3$/y TiO$_2$ is filtered off and an SEM micrograph produced.

Figure 2:
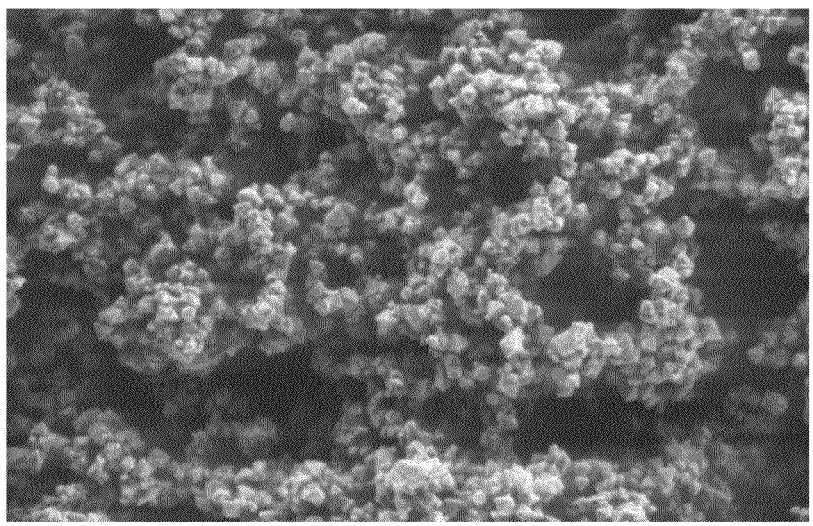

In the case of the composite oxide x Li$_2$TiO$_3$/y TiO$_2$ with a TiO$_2$/LiTiO$_3$ ratio of 1.68 (FIG. 2) it was found that, during the hydrothermal reaction, no particle growth compared with the starting material anatase occurred and also no agglomeration of the free primary particles with a particle size in the range from 100-300 nm took place.

After washing the filter cake, this was dried at 80° C. and then ground.

An air-jet mill for example is used for the grinding.

The composite oxide x Li$_2$TiO$_3$/y TiO$_2$ according to aspects of the invention was then calcined.

It was found that the composite oxide according to aspects of the invention was extremely reactive in the subsequent conversion to lithium titanate through the preceding synthesis. The reaction temperatures of conventional processes for the preparation of lithium titanate starting from a purely physical mixture e.g. of 2 parts Li$_2$TiO$_3$ and 3 parts TiO$_2$ are typically implemented at temperatures of >800-850° C. and reaction times of more than 15 hours.

It was further found that even at low temperatures, for example at 650° C., phase-pure products (i.e. lithium titanate) form after only 15 hours' reaction time. At a temperature of for example 750° C., phase-pure lithium titanate even formed from the foregoing composite oxide after only 3 hours.

Figures 3A, 3B, 3C:
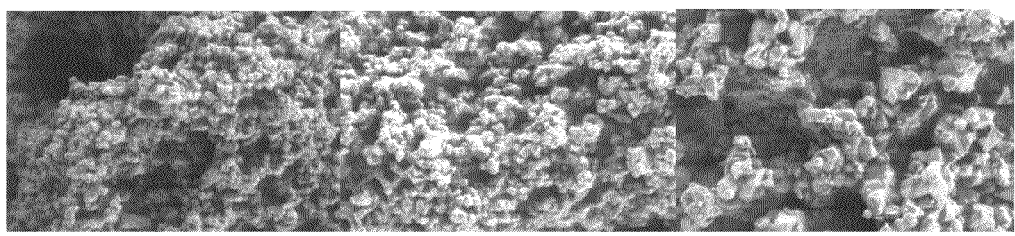

No particle growth during the synthesis of the phase-pure lithium titanate compared with the starting material of the corresponding composite oxide was recorded. However, the particle size increased markedly as the calcining temperature increased:

FIGS. 3a-3c show the effect of the calcining temperature on the particle size of the lithium titanate. The sintering temperatures were 700° C. for FIG. 3a, 750° C. for FIG. 3b and 800° C. for FIG. 3c. As can be seen from FIGS. 3a-3c, the higher the calcining temperature, the larger the particles and the more difficult was then the grinding of the obtained material.

Figure 1:
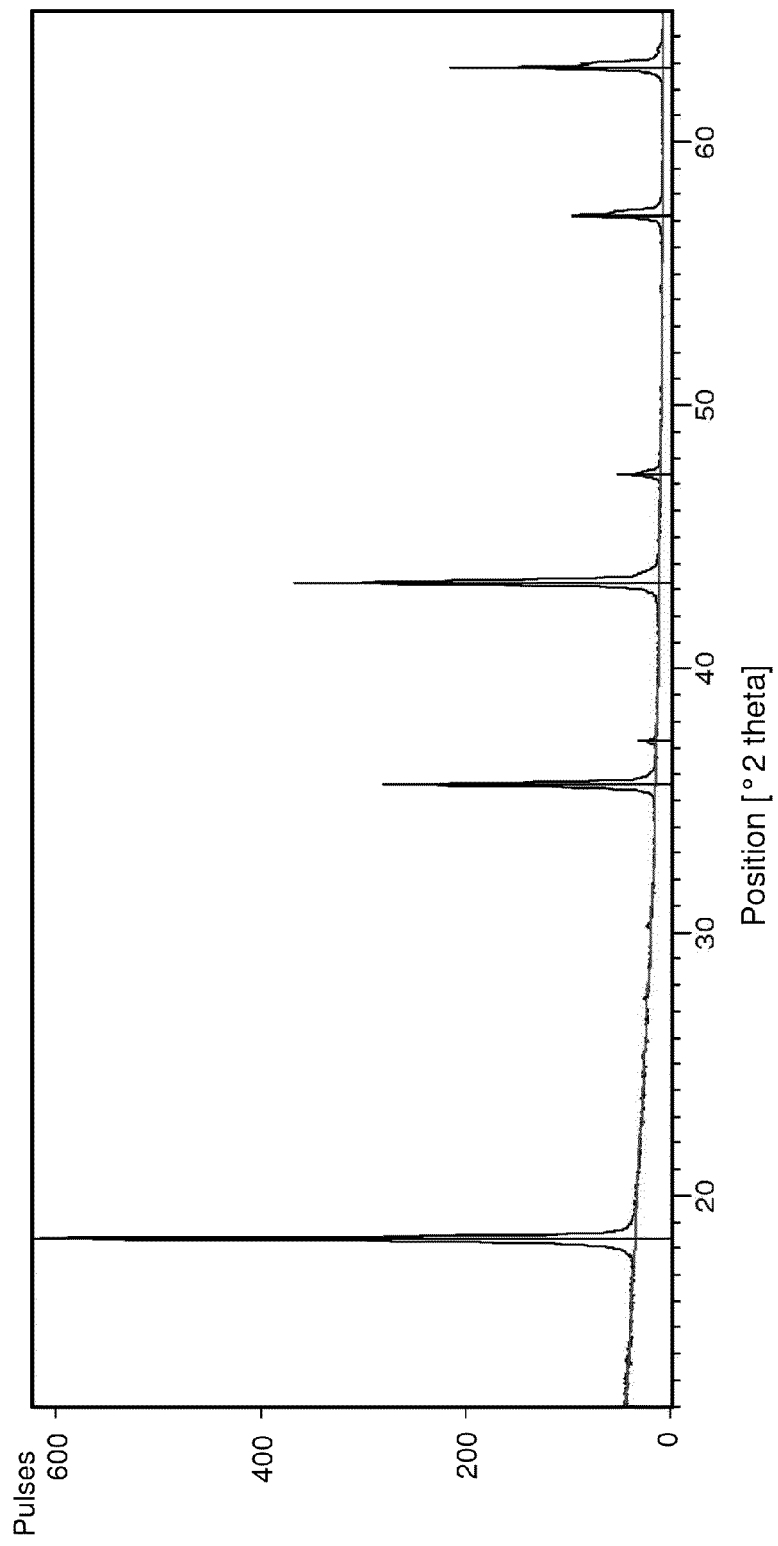
FIG. 1 an X-ray diffractogram of the lithium titanate according to aspects of the invention FIG. 2 an SEM micrograph of a composite oxide $Li_2TiO_3$/$TiO_2$ according to aspects of the invention FIGS. 3a-3c SEM micrographs of the phase-pure lithium titanate according to aspects of the invention which was obtained at different calcining temperatures FIG. 4 an SEM micrograph of lithium titanate according to aspects of the invention which was calcined at a temperature of 850° C.

FIG. 1 shows the X-ray diffractogram of a sample of non-doped lithium titanate obtained according to aspects of the invention which was calcined at 700° C. for 15 hours and shows only reflexes which can be ascribed to pure Li$_4$Ti$_5$O$_{12}$. In particular, this sample does not show reflexes that have to be ascribed to TiO$_2$ in the rutile modification.

Figure 4:
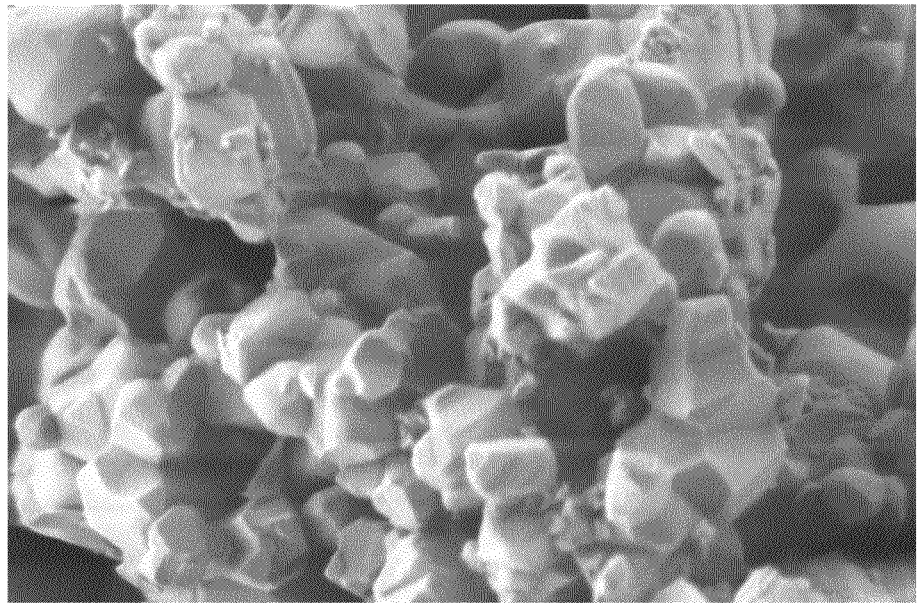

FIG. 4 shows an SEM micrograph of a non-doped lithium titanate calcined at 850° C., but the particles are clearly larger than those that were obtained at low temperatures (see FIGS. 3a-3c), with the result that the particles are strongly caked with each other and a later grinding procedure is made clearly more difficult.

Figure 5:
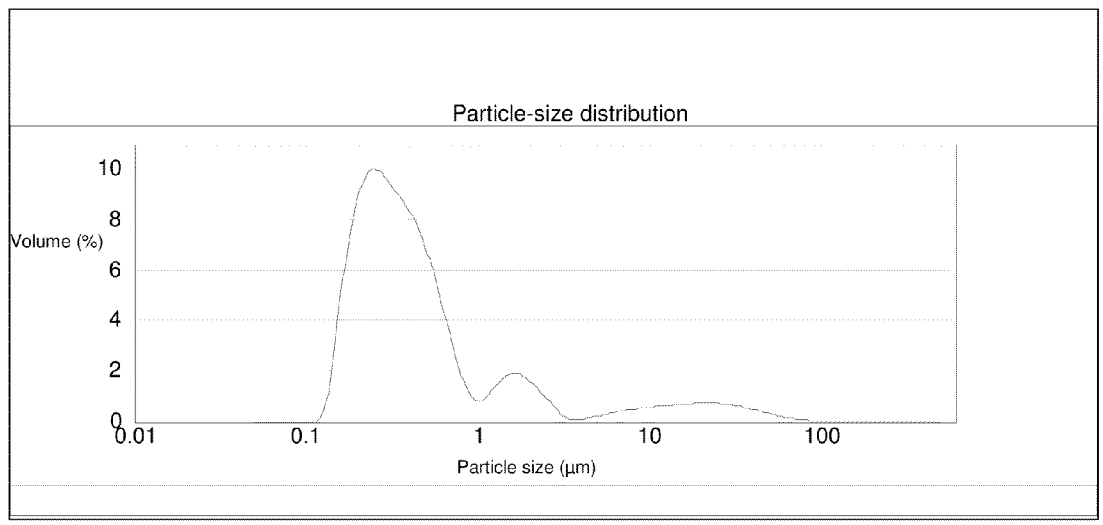
FIG. 5 the particle-size distribution of a lithium titanate according to aspects of the invention FIG. 6 a graph of the cycle stability of the lithium titanate according to aspects of the invention as anode material FIGS. 7a-7b charge/discharge curves of the lithium titanate according to aspects of the invention as anode material.

FIG. 5 shows measurements of the particle-size distribution of lithium titanate according to aspects of the invention which was obtained at 700° C. over 15 hours starting from a composite oxide 2 Li$_2$TiO$_3$/3 TiO$_2$ according to aspects of the invention and which shows a very finely dispersed product. The d$_{50}$ value is 0.36 µm. The coarse fraction with sizes >1 µm consists only of agglomerates and not of primary particles.

Figure 6:
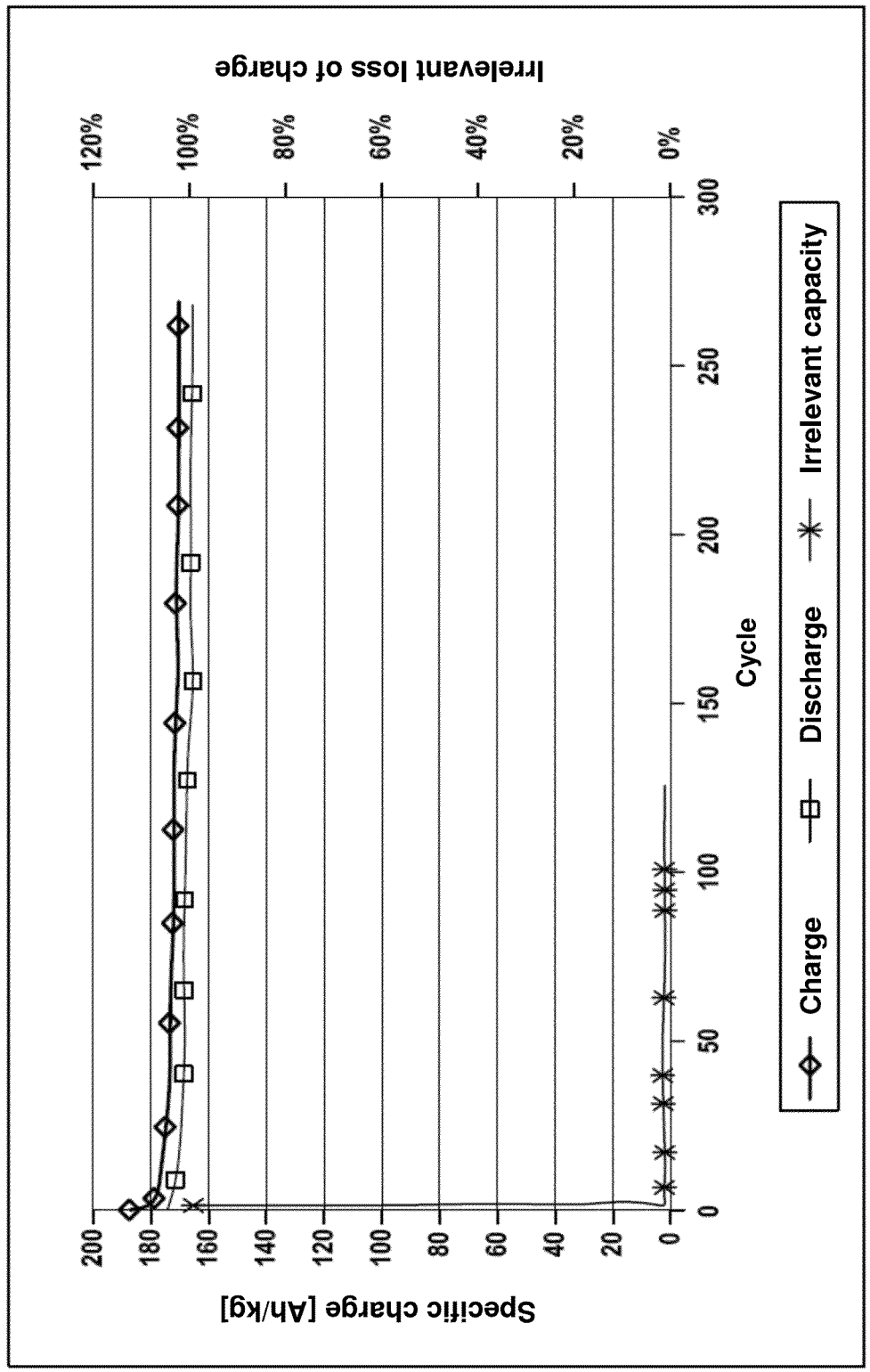

FIG. 6 shows a graph of the cycle stability of non-doped lithium titanate according to aspects of the invention (the material was calcined at 750° C. for 15 hours) as anode of a half cell compared with metal lithium. The electrode formulation consisted of 85% by weight lithium titanate (Li$_4$Ti$_5$O$_{12}$), obtainable according to the process according to aspects of the invention, 10% Super P and 5% Kynar. The active-mass content of the electrode was 2.2 mg/cm$^2$.

The specific charge-discharge capacity which is achieved at low rates of roughly 165 to 170 Ah/kg is close to the theoretical value as against a value of approx. 130 Ah/kg for a lithium titanate Li$_4$Ti$_5$O$_{12}$ which was obtained in a conventional solid-state reaction from TiO$_2$ and Li$_2$CO$_3$ at high temperature.

The capacity and the cycle stability of the Li$_4$Ti$_5$O$_{12}$ according to aspects of the invention in a typical half cell compared with metal lithium are remarkably good at the C rate with an average decline ("fading") of the order of 0.03%/cycle.

Figure 7A:
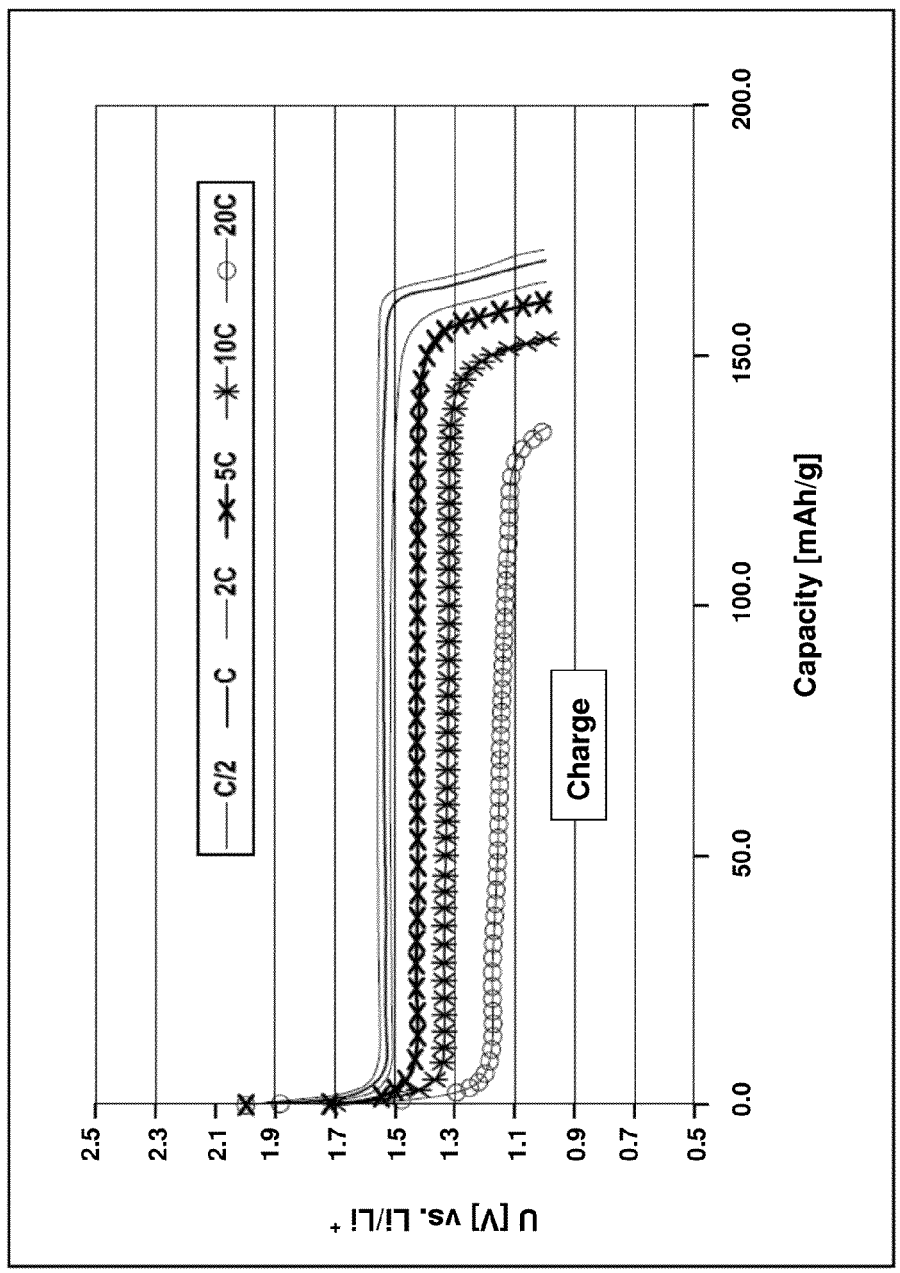
Figure 7B:
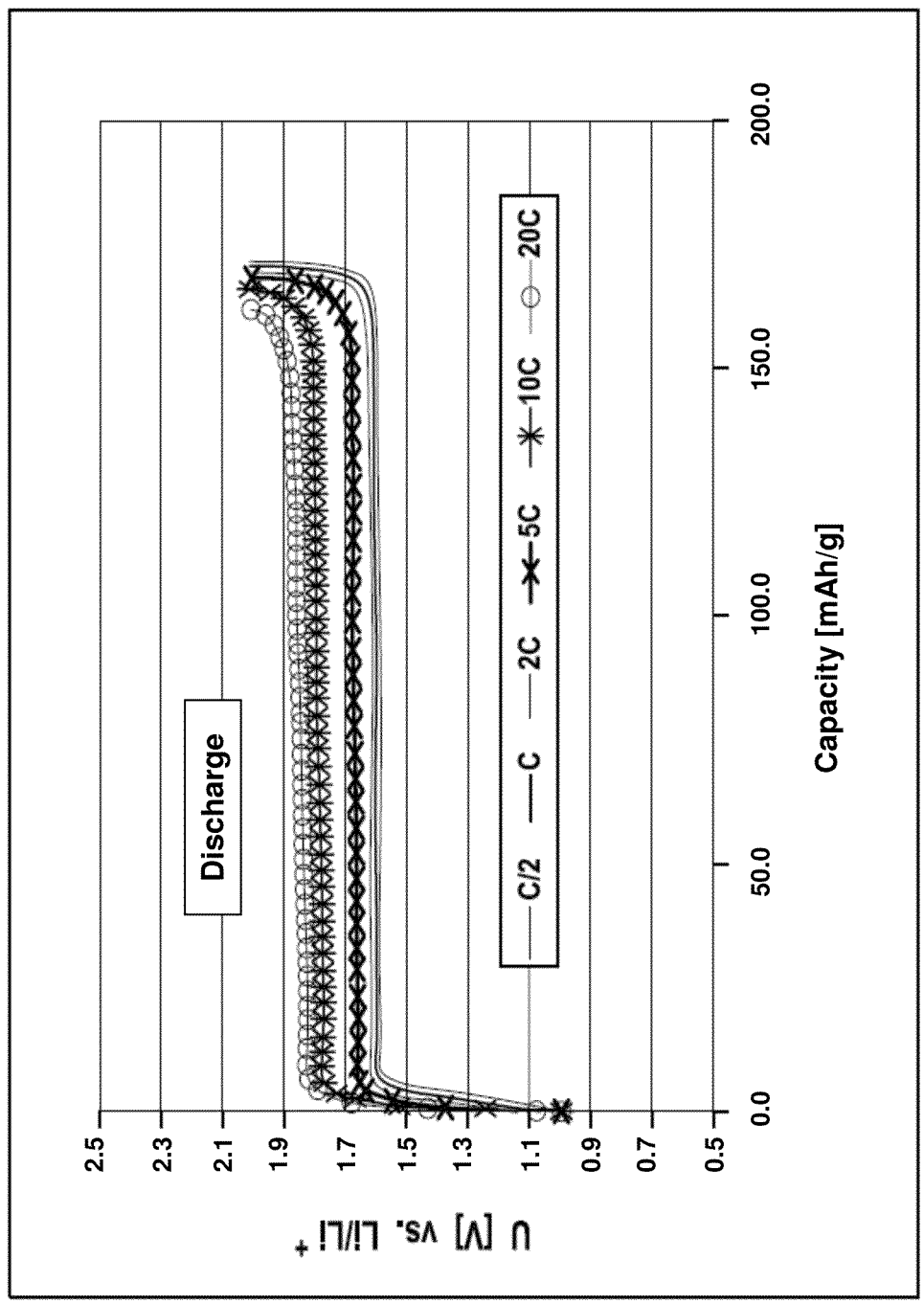

FIG. 7 shows the charge (FIG. 7a)/discharge curves (7b) of the lithium titanate according to aspects of the invention (see below FIG. 6). As can be seen in FIG. 7, an anode according to aspects of the invention shows a capacity retention during discharge of 96% even at a C rate of 20. All cycles of the test cells were operated in the range from 1.0 V-2.0 V at 20° C.

In one aspect, the invention encompasses lithium titanate Li$_4$Ti$_5$O$_{12}$ obtainable by the thermal reaction of a composite oxide containing Li$_2$TiO$_3$ and TiO$_2$, wherein the molar ratio of TiO$_2$ to Li$_2$TiO$_3$ lies in a range from 1.3 to 1.85. In a further aspect, the inventive lithium titanate is characterized in that it is doped with a metal ion. In a further aspect, the doping metal ion is selected from metal ions of the metals of the group consisting of Al, Mg, Ga, Fe, Co, Sc, Y, Mn, Ni, Cr, V or mixtures thereof. In another aspect, the invention encompasses a lithium titanate as previously described, characterized in that its particle size d$_{90}$ is ≤25 µm. In a further aspect, the lithium titanate is characterized in that its particle size d$_{50}$ is ≤1 µm. In a further aspect, the inventive lithium titanate is characterized in that its BET surface area lies in the range from 2-15 m$^2$/g. In a further aspect, the inventive lithium titanate is characterized in that the Li$_2$TiO$_3$ of the composite oxide is present in cubic phase. In a further aspect, the inventive lithium titanate is characterized in that the TiO$_2$ of the composite oxide is present in the anatase modification.

In another aspect, the present invention encompasses a process for the preparation of a composite oxide containing x parts Li$_2$TiO$_3$ in cubic phase and y parts TiO$_2$ in anatase modification, wherein x and y independently of each other stand for a number between 0.1 and 4, said process comprising the steps of:

a) providing an aqueous solution of LiOH; and
b) reacting the aqueous LiOH solution by adding solid TiO$_2$ at a temperature in the range from 100-250° C. In a further aspect, the inventive process is characterized in that TiO$_2$ is used in its anatase modification. In a further aspect, the inventive process is characterized in that the aqueous LiOH solution is kept at a temperature of 100-250° C. during the reaction in step b). In a further aspect, the inventive process is characterized in that the reaction takes place over a period of 10 to 30 hours. In a further aspect, in the inventive process, before or during step b), a compound containing Al, Mg, Ga, Fe, Co, Sc, Y, Mn, Ni, Cr, V or mixtures thereof is further added. In a further aspect, the inventive process is characterized in that the product of the reaction from step b) is then separated. In yet a further aspect, the inventive process is characterized in that the separated product is obtained in a particle size of 100-300 nm.

Another aspect of the present invention encompasses a composite oxide containing x parts Li$_2$TiO$_3$ in cubic form and y parts TiO$_2$ in anatase modification and z parts of a metal oxide, wherein x and y independently of each other are a number between 0.1 and 4, and 0≤z≤1 and the metal is selected from Al, Mg, Ga, Fe, Co, Sc, Y, Mn, Ni, Cr, V or mixtures thereof, obtainable by a process as described in the preceding paragraph.

In another aspect, the present invention relates to a process for the preparation of phase-pure doped or non-doped lithium titanate $Li_4Ti_5O_{12}$, characterized in that a composite oxide containing x parts $Li_2TiO_3$ and y parts $TiO_2$ as well as z parts of a metal oxide, wherein x and y independently of each other are a number between 0.1 and 4, and $0 \leq z \leq 1$ and the metal is selected from Al, Mg, Ga, Fe, Co, Sc, Y, Mn, Ni, Cr, V or mixtures thereof, is sintered at a temperature of $\leq 850°$ C. In a further aspect, the inventive process is characterized in that the duration of the sintering is 1 to 20 hours. In another aspect, the inventive process is characterized in that the sintering is carried out at a temperature of $\leq 750°$ C.

The present invention in another aspect relates to the use of phase-pure doped or non-doped lithium titanate as previously described as anode material for rechargeable lithium-ion batteries.

In a further aspect, the present invention relates to a rechargeable lithium-ion battery, comprising an anode and a cathode as well as an electrolyte, wherein the anode contains non-doped or doped lithium titanate $Li_4Ti_5O_{12}$ as previously described. In a further aspect, the battery is characterized in that the anode has a capacity retention of at least 90% at a rate of 20 C. In a further aspect, the battery is characterized in that the anode has a specific charge/discharge capacity of >160 Ah/kg.

The invention claimed is:

1. A process for the preparation of phase-pure doped or non-doped lithium titanate $Li_4Ti_5O_{12}$ comprising the steps of
   a) providing an aqueous solution of LiOH;
   b) reacting the aqueous LiOH solution by adding solid $TiO_2$ at a temperature in the range from 100-250° C. under hydrothermal conditions over a period of 10 to 30 hours such that a composite oxide is obtained containing $Li_2TiO_3$ in cubic phase and $TiO_2$ in anatase modification having a molar ratio of $TiO_2$ to $Li_2TiO_3$ in the range of 1.3 to 1.85 and a particle size of 100-300 nm; and
   c) sintering the composite oxide at a temperature of $\leq 750°$ C.

2. The process according to claim 1, wherein the duration of the sintering is 1 to 20 hours.

3. The process according to claim 1, wherein the sintering is carried out at a temperature of <700° C.

4. The process according to claim 1, wherein $TiO_2$ is used in its anatase modification.

5. The process according to claim 1, wherein before or during step b) a compound containing Al, Mg, Ga, Fe, Co, Sc, Y, Mn, Ni, Cr, V or mixtures thereof is further added.

6. The process according to claim 1, wherein the product of the reaction from step b) is then separated.

7. A process for producing a rechargeable lithium-ion battery comprising the steps of
   a) preparing a phase-pure doped or non-doped lithium titanate $Li_4Ti_5O_{12}$ according to claim 1, and
   b) using the phase-pure doped or non-doped lithium titanate as an anode material in the rechargeable lithium-ion battery.

8. The process according to claim 7, wherein the anode has a capacity retention of at least 90% at a rate of 20 C.

9. The process according to claim 7, wherein the anode has a specific charge/discharge capacity of >160 Ah/kg.

* * * * *